United States Patent
Uchida et al.

(10) Patent No.: US 10,276,855 B2
(45) Date of Patent: Apr. 30, 2019

(54) METHOD OF MANUFACTURING A LITHIUM-ION SECONDARY BATTERY ELECTRODE SHEET BASED ON AN ACTIVE MATERIAL DRY POWDER

(71) Applicants: TOYOTA JIDOSHA KABUSHIKI KAISHA, Toyota-shi, Aichi (JP); ZEON CORPORATION, Tokyo (JP)

(72) Inventors: Yozo Uchida, Toyota (JP); Yuya Kitagawa, Yokohama (JP); Yuji Shibata, Kawasaki (JP)

(73) Assignees: TOYOTA JIDOSHA KABUSHIKI KAISHA, Toyota-shi, Aichi (JP); ZEON CORPORATION, Tokyo (JP)

( * ) Notice: Subject to any disclaimer, the term of this patent is extended or adjusted under 35 U.S.C. 154(b) by 0 days.

(21) Appl. No.: 15/325,176

(22) PCT Filed: Jun. 29, 2015

(86) PCT No.: PCT/JP2015/003264
§ 371 (c)(1),
(2) Date: Jan. 10, 2017

(87) PCT Pub. No.: WO2016/006197
PCT Pub. Date: Jan. 14, 2016

(65) Prior Publication Data
US 2017/0170452 A1    Jun. 15, 2017

(30) Foreign Application Priority Data

Jul. 11, 2014  (JP) .................................. 2014-143142

(51) Int. Cl.
*B05D 3/12*    (2006.01)
*B05D 5/12*    (2006.01)
(Continued)

(52) U.S. Cl.
CPC ....... *H01M 4/0404* (2013.01); *H01M 4/0435* (2013.01); *H01M 4/139* (2013.01);
(Continued)

(58) Field of Classification Search
CPC .. H01M 4/0404; H01M 4/0435; H01M 4/139; H01M 10/0525; B05D 3/21; B05D 5/12
(Continued)

(56) References Cited

U.S. PATENT DOCUMENTS

2004/0164440 A1    8/2004  Ozaki et al.
2014/0079872 A1*   3/2014  Uchida .................. H01M 4/621
                                                    427/58

FOREIGN PATENT DOCUMENTS

JP      60/028166      *  2/1985
JP      2000-306574 A     11/2000
(Continued)

*Primary Examiner* — Brian K Talbot
(74) *Attorney, Agent, or Firm* — Sughrue Mion, PLLC (57) ABSTRACT

In a method of manufacturing a lithium-ion secondary battery electrode sheet proposed herein, a current collector (11), a powder material (13) of granulated particles, and a binder solution (12) are prepared. The binder solution (12) is applied onto the current collector (11). Subsequently, the powder material (13) of the granulated particles is fed onto the current collector (11). (Then, the powder material (13) of the granulated particles is pressed against the current collector (11). In the basic manufacturing method, adhesive strength of the powder material (13) of the granulated particles is enhanced after the powder material (13) of the granulated particles is fed onto the current collector (11) and before or while the powder material (13) of the granulated particles is pressed against the current collector (11).

16 Claims, 2 Drawing Sheets

(51) Int. Cl.
*H01M 4/04* (2006.01)
*H01M 4/139* (2010.01)
*H01M 10/0525* (2010.01)

(52) U.S. Cl.
CPC ........... *H01M 10/0525* (2013.01); *B05D 3/12* (2013.01); *B05D 5/12* (2013.01)

(58) Field of Classification Search
USPC .......................... 427/58, 115, 359, 365, 369
See application file for complete search history.

(56) References Cited

FOREIGN PATENT DOCUMENTS

| | | | |
|---|---|---|---|
| JP | 2004-186190 A | | 7/2004 |
| JP | 2006-040548 | * | 2/2006 |
| JP | 2013/012327 | * | 1/2013 |
| JP | 2013-12327 A | | 1/2013 |
| JP | 2013/065478 | * | 4/2013 |
| JP | 2013-134897 A | | 7/2013 |
| JP | 2013-143304 A | | 7/2013 |
| JP | 2015-11896 A | | 1/2015 |

* cited by examiner

METHOD OF MANUFACTURING A LITHIUM-ION SECONDARY BATTERY ELECTRODE SHEET BASED ON AN ACTIVE MATERIAL DRY POWDER

TECHNICAL FIELD

The present invention relates to a method of manufacturing a lithium-ion secondary battery electrode sheet. The present application claims priority from Japanese Patent Application No. 2014-143142, filed on Jul. 11, 2014, the entirety of which is incorporated by reference into this specification. In the present description, the term "secondary battery" refers to a repeatedly rechargeable battery in general. The term "lithium-ion secondary battery" means a secondary battery that uses lithium ions as the electrolyte ions and implements charging and discharging by the transfer of electric charge which is associated with the transfer of the lithium ions between the positive and negative electrodes. The lithium-ion secondary battery is one type of non-aqueous electrolyte secondary battery, which uses a non-aqueous electrolyte comprising a non-aqueous solvent in which an electrolyte salt is dissolved.

BACKGROUND ART

JP 2013-012327 A, for example, discloses that an electrode sheet is manufactured by coating a binder solution on an electrode current collector, thereafter depositing powder containing an active material and a binder thereon, and pressing the deposited layer in a thickness direction while heating the deposited layer.

JP 2013-143304 A discloses a method of manufacturing an electrode sheet by powder molding. The publication discloses that an electrode sheet is formed by granulating an electrode mixture containing graphite while applying a magnetic field thereto to obtain an electrode mixture powder, then feeding the resultant powder onto the current collector foil, and then pressing the current collector foil.

JP 2013-134897 A discloses the following. A hot melt binder aqueous solution in a liquid state is applied onto the surface of a sheet-shaped current collector and dried, and granulated particles containing active material particles and a binder are fed onto the surface of the current collector. Then, the current collector, the hot melt binder layer, and the granulated particles are compressed in a thickness direction of the current collector, while being heated.

As described above, various publications disclose that an electrode sheet having an active material layer formed On a current collector is manufactured by depositing powder of granulated particles containing an active material and a binder on a current collector and compressing the deposited powder and the current collector in a thickness direction. On the other hand, there is another method of manufacturing an electrode sheet. The method involves coating a current collector with a mixture paste containing an active material and a binder mixed with a solvent, and drying the paste, to form an active material layer. The method of coating a current collector with a mixture paste and drying the paste to form an active material layer is introduced as prior art in, for example, JP 2013-134897 A.

CITATION LIST

Patent Literature

[PLT 1] JP 2013-012327 A
[PLT 2] JP 2013-143304 A
[PLT 3] JP 2013-134897 A

SUMMARY OF INVENTION

Technical Problem

According to the discovery of the present inventors, the peel strength of the active material layer tends to be lower in the case where the active material layer is formed by depositing powder of granulated particles than in the case where the active material layer is formed by coating the current collector with a mixture paste and drying the paste. The present inventors believe the cause of this tendency to be that pressing the granulated particles against the current collector foil provides only a small contact area of the binder in the case where the active material layer is formed by depositing powder of granulated particles.

On the other hand, in the case where the active material layer is formed by coating the current collector with a mixture paste and drying the paste, the binder component contained in the paste is dried and solidified in such a condition that the binder component is adhered extensively to the surfaces of the active material particles, which are also contained in the paste. In other words, the contact area of the binder is large in this case because the binder is dried in such a condition that it is adhered extensively to the active material particles and the current collector foil according to the surface tension of the paste. For this reason, the method of forming the active material layer by coating the current collector with a mixture paste and drying the paste tends to produce an active material layer having a higher peel strength than the method of forming the active material layer from the powder material of granulated particles.

On the other hand, the method of forming the active material layer by depositing powder of granulated particles does not have the drying step. This provides an advantage that the manufacturing cost can be lowered than the method of forming the active material layer by coating the current collector with a mixture paste and drying the paste.

From such a unique perspective, the present inventors believe that it is desirable to adopt the method of forming the active material layer by depositing powder of granulated particles on the current collector and pressing the current collector provided with the powder of granulated particles in order to keep the manufacturing cost low, and improve the peel strength of the obtained active material layer at the same time.

Solution to Problem

A method of manufacturing a lithium-ion secondary battery electrode sheet proposed herein includes the following steps of:
(a) preparing a current collector;
(b) preparing granulated particles containing active material particles and a binder;
(c) preparing a binder solution;
(d) applying the binder solution onto the current collector;
(e) feeding a powder material of the granulated particles onto the current collector;
(f) pressing the powder material of the granulated particles against the current collector; and
(g) subsequent to the step (e) and prior to or during the step (f), enhancing adhesive strength of the powder material of the granulated particles that has been fed on the current collector.

This manufacturing method makes it possible to improve the peel strength of the obtained active material layer while keeping the manufacturing cost low. Here, the binder contained in the granulated particles and the binder contained in the binder solution may be the same as or different from each other. It should be noted that the order of the steps is not limited to the order of the steps as listed above, unless specifically stated otherwise.

For example, the method of manufacturing a lithium-ion secondary battery electrode sheet may be such that a solvent is added to the powder material of the granulated particles subsequent to the step (e) and prior to or during the step (f). Here, the term "solvent" means one that is in a liquid form, and it may be any type of solvent, such as water and an organic solvent, as long as it is in a liquid state. Herein, examples of the organic solvent include alcohols, ethers, ketones, aromatic hydrocarbons, and chlorinated hydrocarbons. In this case, it is desirable that the solvent be added to the powder material of the granulated particles prior to the step (f). It is also possible that the method of manufacturing a lithium-ion secondary battery electrode sheet may comprise imparting shearing stress to the powder material of the granulated particles while pressing the powder material of the granulated particles against the current collector.

It is also possible that, in the step of pressing or in the step of imparting shearing stress, the current collector and the granulated particles may be pressed by a pair of pressure rollers. In this case, it is possible that the pair of pressure rollers may be rotated at different rotational speeds. By using a pair of pressure rollers having different rotational speeds in this way, an appropriate level of shearing stress can be imparted to the powder material of the granulated particles. In this case, it is possible, for example, that the rotational speed of the pressure roller to be pressed against the powder material of the granulated particles may be made slower than that of the pressure roller to be pressed against the current collector.

DESCRIPTION OF EMBODIMENTS

The following description is given to illustrate an example of the embodiments of a method of manufacturing a lithium-ion secondary battery electrode sheet proposed herein. The embodiments described herein are not intended to limit the present invention. The drawings are depicted schematically, and the dimensional relationship (length, width, thickness, and the like) in the drawings, for example, does not necessarily reflect actual dimensional relationship. The parts and components that exhibit the same effects are denoted by the same reference symbols, and repetitive description thereof may be omitted as appropriate.

Figure 1:
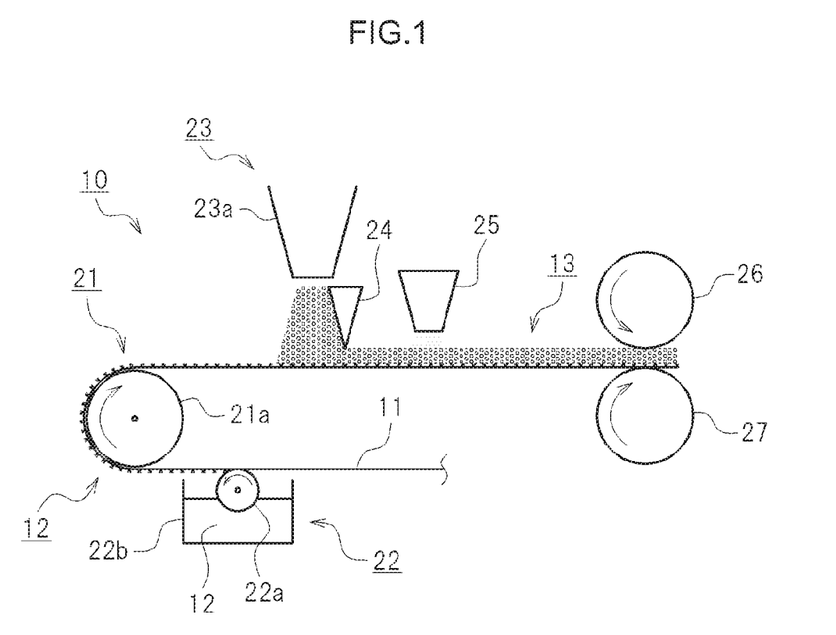
FIG. 1 is a schematic view illustrating a manufacturing apparatus that embodies a method of manufacturing a lithium-ion secondary battery electrode sheet proposed herein.
Figure 2:
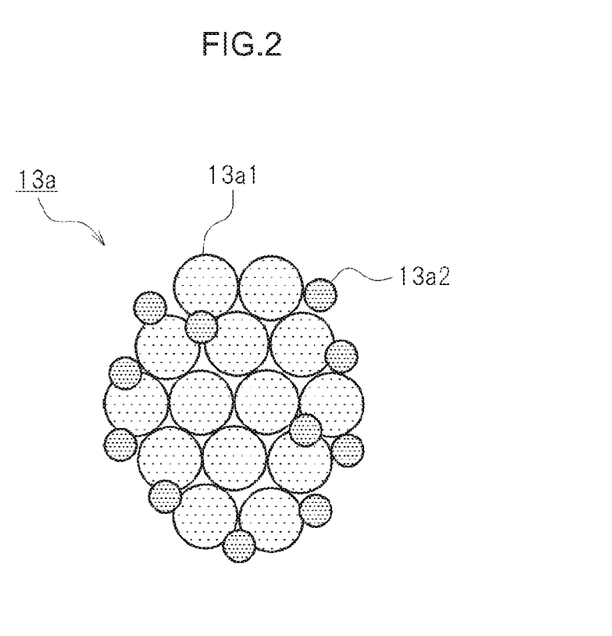
FIG. 2 is a schematic view schematically illustrating a granulated particle.

FIG. 1 is a schematic view illustrating a manufacturing apparatus 10 that embodies a method of manufacturing a lithium-ion secondary battery electrode sheet proposed herein. As illustrated in FIG. 1, the manufacturing apparatus 10 has a conveyor device 21 for conveying a current collector 11, a coating device 22 for applying a binder solution 12, a feeding device 23 for feeding a powder material 13 of granulated particles 13a (see FIG. 2), a squeegee 24, a humidifier device 25, and pressure rollers 26 and 27. FIG. 2 is a view schematically illustrating the granulated particle 13a.

A method of manufacturing a lithium-ion secondary battery electrode sheet proposed herein includes the following steps 1 through 7:
1. preparing a current collector 11;
2. preparing granulated particles 13a;
3. preparing a binder solution;
4. applying the binder solution onto the current collector 11;
5. feeding a powder material 13 of the granulated particles 13a onto the current collector 11;
6. pressing the powder material 13 of the granulated particles 13a against current collector 11; and
7. subsequent to feeding the powder material 13 of the granulated particles and prior to or during pressing the powder material 13 of the granulated particles 13a against the current collector 11, enhancing adhesive strength of the powder material 13 of the granulated particles 13a.

«Step of Preparing the Current Collector 11»

At step 1, the current collector 11 is prepared. The current collector 11 prepared here is a member for obtaining electricity in the lithium-ion secondary battery electrode sheet. For example, the material suitable as the current collector 11 used for a lithium-ion secondary battery is a material that has good electron conductivity and is capable of existing stably within the battery. The current collector 11 also requires being lightweight, predetermined mechanical strength, processability, and so forth. For example, an aluminum foil is used as the current collector 11 for the positive electrode of a lithium-ion secondary battery. A copper foil is used as the current collector 11 for the negative electrode thereof. In the example shown in FIG. 1, a strip-shaped metal foil (specifically, an aluminum foil or a copper foil) is prepared as the current collector, and although not shown in the figure, it is prepared in a condition of being coiled around a winding core. In FIG. 1, the strip-shaped current collector foil 11 is conveyed by the conveyor device 21 along a predetermined conveyance passage. Such a strip-shaped current collector foil 11 is suitable for subjecting it to a predetermined treatment while it is being conveyed in a roll-to-roll process, as illustrated in FIG. 1. It should be noted that although the current collector 11 herein is prepared in the form of strip-shaped current collector foil, it may be formed in the form of a sheet-shaped current collector foil having a predetermined shape and may be processed by a sheet-by-sheet system.

«Step of Preparing Granulated Particles 13a»

At step 2, the granulated particles 13a are prepared. It is desirable that the granulated particles 13a prepared here contain at least active material particles 13a1 and a binder 13a2. The powder material 13 of the granulated particles 13a can be obtained by, for example, granulating a mixture (suspension) in which the active material particles 13a1 and the binder 13a2 are mixed with a solvent by a spray drying method. In the spray drying method, the mixture is sprayed in a dry atmosphere. At this stage, the particles contained in each of the sprayed droplets are merged into roughly one aggregate and formed into a larger particle. Therefore, depending on the size of the droplets, the solid content contained in the granulated particle 13a can vary, and also, the size, mass, and the like of the granulated particle 13a can vary.

Such droplets cause migration in the process of being dried. Here, the particle of the binder 13a2 contained in the droplet is smaller than the active material particle 13a1, and the density thereof is also lower. For this reason, in the process of being dried, the binder tends to move toward the surface of the droplet. As a result, the granulated particle 13a in which the binder 13a2 is biased toward the surface is obtained, as illustrated in FIG. 2. Herein, the phrase "the binder 13a2 is biased toward the surface" means the condition in which the component of the binder 13a2, is contained in a greater amount in a portion of the granulated particle 13a near the surface than a central portion of the granulated particle 13a. It is desirable that the droplets to be sprayed contain at least the active material particles 13a1 and the hinder 13a2. It is also possible that the droplets to be sprayed may contain materials other than the active material particles 13a1 and the binder 13a2. For example, a conductive agent may be contained therein.

<Active Material Particle 13a1>

Herein, the active material particles 13a1 contained in the granulated particles 13a may vary depending on the electrode sheet to be manufactured. When an electrode sheet for the positive electrode of a lithium-ion secondary battery is manufactured, the active material particles for the positive electrode are used for the active material particles 13a1. On the other hand, when an electrode sheet for the negative electrode is manufactured, the active material particles for the negative electrode are used for the active material particles 13a1.

<Examples of Active Material Particles Used in Positive Electrode for Lithium-ion Secondary Battery>

Herein, the lithium-ion secondary battery is taken as an example. Preferable examples of the active material particles 13a1 used in the positive electrode of the lithium-ion secondary battery include: oxides containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and phosphates containing lithium and one or more transition metal elements, such as lithium manganese phosphate ($LiMnPO_4$) and lithium iron phosphate ($LiFePO_4$). These are used in particulate form and may be referred to as positive electrode active material particles, as appropriate. The positive electrode active material particles may be used either alone or in combination. Because these positive electrode active material particles have low electrical conductivity, the positive electrode active material layer contains a conductive agent in order to enhance the electrical conductivity. In this case, it is desirable that the conductive agent be contained in droplets that are sprayed in spray drying.

<Examples of Active Material Particles Used in Negative Electrode of Lithium-ion Secondary Battery>

Preferable examples of the active material particles used in the negative electrode of the lithium-ion secondary battery include carbon-based materials, such as graphite carbons and amorphous carbons, lithium-transition metal oxides, and lithium-transition metal nitrides. These are used in particulate form and may be referred to as negative electrode active material particles, as appropriate. The negative electrode active material particles may be used either alone or in combination. The negative electrode active material layer may contain a conductive agent in order to enhance the electrical conductivity. In this case, it is desirable that the conductive agent be contained in droplets that are sprayed in spray drying.

<Conductive Agent (Conductivity Enhancing Agent)>

Examples of the conductive agent include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, and Ketjen Black) and graphite powder. It is desirable to use such a conductive agent for forming conductive paths between the active material particles 13a1 and the current collector 11 when the used active material particles 13a1 have poor electrical conductivity.

«Binder 13a2»

Next, the following describes the binder 13a2 that is to be added to the granulated particles 13a in the step of preparing granulated particles 13a. The granulated particles 13a are preferably granulated by a spray drying method. For this reason, a polymer that can be dissolved or dispersed in a solvent is used as the binder 13a2 that is to be added to the granulated particles 13a. Examples of the polymer that can be dissolved or dispersed in an aqueous solvent include rubber materials (such as styrene-butadiene copolymer (SBR) and acrylic acid-modified SBR resin (SBR latex)), polyvinyl alcohols (PVA), vinyl acetate copolymers, and acrylate polymers. Examples of the polymer that can be dissolved or dispersed in a non-aqueous solvent include polymers such as polyvinylidene fluoride (PVFD), polyvinylidene chloride (PVDC), and poly-acrylonitrile (PAN). It is also possible to use polyethylene oxide (PEO), a fluoropolymer (such as polytetrafluoroethylene (PTFE) and tetrafluoroethylene-hexafluoropropylene copolymer (FEP)), or the like, as the binder 13a2 that is to be added in the granulated particles 13a. Note that although examples of the binder 13a2 that is to be added to the granulated particles 13a are shown herein, the binder 13a2 that is to be added to the granulated particles 13a is not limited to the examples shown herein. The droplets sprayed in the spray drying may contain cellulose-based polymers (such as carboxymethylcellulose (CMC) and hydroxypropyl methyl cellulose (HPMC)) as a thickening agent.

«Step of Preparing Binder Solution 12»

At step 3, the binder solution 12 is prepared. The binder solution 12 prepared here is a solution in which a binder is mixed with a solvent. Here, from the viewpoint of reducing the environmental load, it is preferable to use what is called an aqueous solvent as the solvent for the binder solution 12. In this case, water or a mixed solvent mainly composed of water is used. The solvent of the binder solution 12 is not limited to what is called an aqueous solvent, but may be what is called an organic-based solvent. An example of the organic-based solvent is N-methylpyrrolidone (NMP).

It is preferable that the binder contained in the binder solution 12 be one that can be dispersed in a solvent. In the present embodiment, preferable examples include styrene-butadiene rubber (SBR) and polyacrylic acid (PAA), because the solvent is an aqueous solvent. In the present embodiment, SBR is used as the binder. When an organic-based solvent is used as the solvent, preferable examples of the binder include polyvinylidene fluoride (PVDF) and polyacrylic acid (PAA). A preferable example of the binder solution 12 may be a SBR aqueous solution (40 wt %) in which SBR as the binder is contained at a concentration of 40 wt % and water is used as the solvent.

«Step of Applying Binder Solution 12»

At step 4, the binder solution 12 is applied onto the current collector foil 11. It is desirable that the binder solution 12 be applied onto the current collector 11 in a predetermined pattern. It is also desirable that the binder solution 12 be applied thinly onto the current collector 11, for example, at a thickness of from about 1 μm to 20 μm, and be applied by gravure printing or the like. For example, FIG. 1 shows a direct gravure roll coater as an example of the coating device 22. It is desirable to transfer the binder solution 12 onto the current collector 11 by direct gravure printing using the gravure roller 22a having minute patterns engraved on the surface thereof. Here, it is desirable that the gravure roller 22a have, for example, grooves having a print depth of about from 10 μm to 30 μm (for example, 20 μm), a width of 50 μm, and a pitch of 200 μm, along an oblique line inclined with respect to the rotational axis. The pattern of the grooves formed in the gravure roller 22a may be a grid pattern or may be a pattern in which oblique lines are combined in a grid pattern. The width and the pitch of the grooves may be varied in a variety of ways. In the example shown in FIG. 1, it is desirable that the strip-shaped current collector foil 11 should be conveyed so that the treatment surface to be coated with the binder solution 12 (i.e., the surface on which the active material layer is to be formed) faces downward, and the gravure roller 22a should be brought into contact with the current collector foil 11. The lower side of the gravure roller 22a is immersed in the binder solution 12 stored in a reservoir 22b. Thereby, the binder solution 12 stored in the reservoir 22b is continuously transferred to the current collector 11 through the gravure roller 22a.

«Step of Feeding Powder Material 13»

At step 5, the powder material 13 of the granulated particles 13a is fed onto the current collector 11. In the example shown in FIG. 1, the current collector 11 (strip-shaped current collector foil) is wrapped around the conveying roller 21b of the conveyor device 21 and is conveyed so that the treatment surface coated with the binder solution 12 faces upward. The feeding device 23, the squeegee 24, the humidifier device 25, and the pressure rollers 26 and 27 are disposed in that order in the conveyance passage of the current collector 11.

<Feeding Device 23>

The powder material 13 of the granulated particles 13a is fed onto the current collector 11 by the feeding device 23. The feeding device 23 is provided with a hopper 23a for storing the powder material 13 of the granulated particles 13a. Although not shown in the drawings, it is desirable that the hopper 23a be provided with an adjusting device for adjusting the amount of the powder material 13 of the granulated particles 13a to be supplied. In this case, for example, the hopper 23a should desirably adjust the feeding amount of the powder material 13 according to the conveying speed of the current collector 11 to feed an appropriate amount of the powder material 13 onto the current collector 11.

<Squeegee 24>

In this step, it is desirable that the powder material 13 that has been fed on the current collector 11 be made uniform. In this embodiment, the squeegee 24 is provided on the downstream side of the feeding device 23 (i.e., on the downstream side in the conveyance passage of the current collector foil). The squeegee 24 adjusts the thickness of the powder material 13 that has been fed on the current collector 11. The squeegee 24 adjusts the gap from the current collector 11 to be conveyed, to adjust the thickness of the powder material 13 that passes therebetween. The squeegee 24 may be a blade-shaped member or a roller-shaped member. It is desirable that the gap between the squeegee 24 and the conveyed current collector 11 be adjusted to, for example, from about 100 μm to about 300 μm (preferably from about 150 μm to about 250 μm), although it may depend on the particle size and the weight per unit area (designed weight per unit area) of the granulated particle 13a.

«Step of Pressing Powder Material 13 Against Current Collector 11»

At step 6, the powder material 13 of the granulated particles 13a is pressed against the current collector 11. In this embodiment, the pressure rollers 26 and 27 are members for sandwiching the current collector 11 and the powder material 13 of the granulated particles 13a in the conveyance passage in which the strip-shaped current collector foil 13a is conveyed. In this case, it is desirable that the gap between the pressure rollers 26 and 27 be adjusted taking the thickness of the powder material 13 to be deposited on the current collector 11 into consideration. As a result, the powder material 13 of the granulated particles 13a is pressed against the current collector 11 with an appropriate force. Thus, the number of contact locations of the binder 13a2 is increased in the powder material 13 of the granulated particles 13a, so the granulated particles 13a are allowed to obtain a required adhesive strength.

«Step of Enhancing Adhesive Strength of Powder Material 13 of Granulated Particles 13a»

At step 7, adhesive strength of the powder material 13 of the granulated particles 13a is enhanced subsequent to feeding the powder material 13 of the granulated particles and prior to or during pressing the powder material 13 of the granulated particles 13a against the current collector 11. The phrase "subsequent to feeding the powder material 13 of the granulated particles" means subsequent to the step of feeding the powder material 13 of the granulated particles 13a onto the current collector 11. In FIG. 1, it is after the current collector has passed through the squeegee 24. The phrase "prior to or during pressing the powder material 13 against the current collector 11" means to include both a timing during which the powder material 13 is pressed against the current collector 11 and a timing before the powder material 13 is pressed against the current collector 11. It is a timing that includes the timing during which the powder material 13 is pressed against the current collector 11 and therebefore. In other words, it is desirable that the adhesive strength of the powder material 13 of the granulated particles 13a be enhanced when the powder material 13 of the granulated particles 13a is pressed against the current collector 11 to cause the powder material 13 of the granulated particles 13a to closely adhere to the current collector 11. There are several methods for enhancing the adhesive strength of the powder material 13 of the granulated particles 13a when making the powder material 13 of the granulated particles 13a to adhere to the current collector 11.

<Humidifying>

As a method of enhancing the adhesive strength of the powder material 13 of the granulated particles 13a, it is possible, for example, to add a solvent to the powder material 13 of the granulated particles 13a subsequent to the step of feeding the powder material 13 and prior to or during the step of pressing the powder material 13 against the current collector 11. When a solvent is added to the powder material 13 of the granulated particles 13a, the viscosity of the binder contained in the granulated particle 13a increases because the binder contains the solvent, so the adhesion strength of the hinder is improved. In this case, it is desirable that the solvent be added to the powder material 13 of the granulated particles 13a before the powder material 13 is pressed against the current collector 11.

For example, in the manufacturing apparatus 10 shown in FIG. 1, the feeding device 23 feeds the powder material 13 onto the current collector 11. In addition, the humidifier device 25 is provided in the middle of the conveyance passage of the current collector 11, past the feeding device 23 toward the pressure rollers 26 and 27. The humidifier device 25 may be such a device that sprays fine droplets, like fog, of the solvent on the powder material 13 of the granulated particles 13a. For the humidifier device 25, it is desirable, for example, to use a commercially available spray device. Preferably, extremely fine droplets with a size of about 100 nm to 1000 nm should be sprayed using a commercially available electrostatic spray device. When using an electrostatic spray device, the droplets repel each other because the droplets are electrically charged. As a result, the droplets can be sprayed on the powder material 13 of the granulated particles 13a while being kept to be fine. Moreover, the droplets are quickly absorbed into the powder material 13 of the granulated particles 13a because the droplets are kept to be line. Although it is not specifically mentioned, it is sufficient that the amount of the solvent to be added should be such an amount that the adhesion strength of the binder contained in the powder material 13 of the granulated particles 13a is improved, and it does not need to be greater than that. For example, if the amount of the solvent is too large, the step of drying the solvent is needed, and the advantage of forming the active material layer using the powder material 13 of the granulated particles 13a is lost. It is sufficient that the humidifier device 25 is such a device that can add a solvent to the powder material 13 of the granulated particles 13a. Thus, the humidifier device 25 is not limited to the above-described electrostatic spray, but may be other types of spray devices and humidifier devices.

<Imparting Shearing Stress>

As a method of enhancing the adhesive strength of the powder material 13 of the granulated particles 13a, it is possible, for example, to impart shearing stress to the powder material 13 of the granulated particles 13a while pressing the powder material 13 of the granulated particles 13a against the current collector 11. For example, herein, in the step of pressing the powder material 13 of the granulated particles 13a against the current collector 11, the current collector 11 and the powder material 13 of the granulated particles 13a are pressed by a pair of pressure rollers 26 and 27, as illustrated in FIG. 1. To impart shearing stress to the powder material 13 of the granulated particles 13a, for example, it is desirable that the pair of pressure rollers 26 and 27 may be rotated at different rotational speeds in the above-described step. Thereby, shearing stress acts on the powder material 13 of the granulated particles 13a. For example, from the viewpoint of imparting an appropriate level of shearing stress, it is desirable that the difference of the rotational speeds (circumferential speed) of the two pressure rollers 26 and 27 be from 2% to 8%, with reference to the rotational speed of the pressure roller 27 that is opposite to the pressure roller 26 that comes into contact with the powder material 13 of the granulated particles 13a. Preferably, the rotational speed of the pressure roller 26 that comes into contact with the powder material 13 of the granulated particles 13a may be slower than the other pressure roller 27. In the case of imparting shearing stress to the powder material 13 of the granulated particles 13a while pressing the powder material 13 of the granulated particles 13a against the current collector 11, the above-described humidifying is not necessarily needed, and the adhesive strength of the powder material 13 of the granulated particles 13a can be enhanced even without the humidifying. However, humidifying may be carried out additionally. By carrying out humidifying additionally, the adhesive strength of the powder material 13 of the granulated particles 13a can be further improved.

In this case, the binder 13a2 (see FIG. 2) contained in the powder material 13 of the granulated particles 13a receives shearing stress, and the binder 13a2 is stretched between the active material particles 13a1 or between the current collector 11 (current collector foil) and the active material particles 13a1. Therefore, the contact area of the binder 13a2 with the active material particles 13a1 or with the current collector 11 is increased. As a result, the adhesion strength of the hinder 13a2 is increased, and the adhesive strength between the powder material 13 of the granulated particles 13a and the current collector 11 is enhanced. It should be noted that the device for imparting shearing stress to the powder material 13 of the granulated particles 13a is not limited to the pressure rollers 26 and 27. For example, in a sheet-by-sheet process, it is possible to adopt a press device having a pair of flat plates. In this case, it is possible that the pair of flat plates that sandwiches the current collector 11 and the powder material 13 of the granulated particles 13a may be dislocated relative to each other to impart shearing stress to the powder material 13 of the granulated particles 13a.

In this case, for example, it is desirable to prepare the powder material of the granulated particles in which the binder is biased toward the surface in the step of preparing granulated particles. More specifically, it is desirable that the granulation be performed by a spray drying method, by spraying a mixture (suspension) containing the active material particles 13a1 and the binder 13a2 using a spray drying granulation machine, as described above. In this case, due to the migration that occurs in the spray drying process, the binder 13a2 is biased toward the surface of the granulated particle 13a. When the binder 13a2 is biased toward the surface of the granulated particle 13a, the binder 13a2 is interposed between the granulated particles 13a and between the granulated particles 13a and the current collector 11. When shearing stress is imparted to the powder material 13 of the granulated particles 13a under such a condition, the binder 13a2 being in contact with the granulated particle 13a is stretched by the force that acts on the active material particles 13a1 and the current collector 11. As a result, the contact area between the binder 13a2 and the granulated particles 13 is increased, and the adhesive strength of the powder material 13 is enhanced.

<Examples of Construction of Lithium-Ion Secondary Battery>

For the positive electrode of the lithium-ion secondary battery, it is desirable that, in the step of preparing granulated particles, a mixed solution comprising positive electrode active material particles, a binder, and a conductive agent mixed in a solvent be prepared, and the solution be sprayed and dried in the spray drying granulation machine, to granulate composite particles. Here, an acrylic resin (such as polymethyl methacrylate), for example, may be used as the binder to be contained in the droplets that are sprayed in spray drying. The amount of the acrylic resin to be added should desirably be about 1.5 wt %, for example. Acetylene black, for example, is used as the conductive agent. It is desirable that the mean particle size (D50) of the granulated particles 13a prepared in this way be about 80 μm.

For the negative electrode of the lithium-ion secondary battery, it is desirable that, in the step of preparing granulated particles, a mixed solution comprising negative electrode active material particles and a binder mixed in a solvent be prepared, and the solution be sprayed and dried in the spray drying granulation machine, to granulate composite particles. Here, graphite particles coated with amorphous carbon (amorphous coated graphite), for example, may be used for the negative electrode active material particles. Styrene-butadiene copolymer (SBR) is used as the binder. The amount of the styrene-butadiene copolymer to be added should desirably be about 0.7 wt %, for example. It is desirable that the mean particle size (D50) of the granulated particles 13a prepared in this way be about 80 μm.

The powder material 13 of the granulated particles 13a obtained herein is fed onto the current collector 11. At this time, it is desirable that the gap between the squeegee 24 and the current collector 11 be adjusted to, for example, about 200 μm. Then, in order to enhance the adhesive strength of the powder material 13 of the granulated particles 13a, it is desirable that water be added as the solvent and the powder material 13 of the granulated particles 13a be pressed against the current collector 11. It is desirable that the water be added in an amount of from about 0.01 mL/cm$^2$ to about 0.1 mL/cm$^2$ by electrostatic spraying. In this case, the contact area of the binder 13a2 with the active material particles 13a1 or the current collector 11 is increased because of the effect of adding water as the solvent. As a result, the adhesion strength of the binder 13a2 is increased, and the adhesive strength between the powder material 13 of the granulated particles 13a and the current collector 11 is enhanced. In this case, an electrode sheet provided with an active material layer having a higher peel strength can be obtained than in the case of preparing the electrode sheet by only pressing the powder material 13 of the granulated particles 13a against the current collector 11. without adding water as the solvent, provided that the powder material 13 of the granulated particles 13a is pressed against the current collector 11 with the same pressing amount (or the same pressing force).

It is also possible that, without adding water as the solvent to the powder material 13 of the granulated particles 13a, shearing stress alone may be imparted to the powder material 13 while pressing the powder material 13 of the granulated particles 13a against the current collector 11. In this case as well, the contact area of the binder 13a2 with the active material particles 13a1 or the current collector 11 is increased in comparison with the case of only pressing the powder material 13 of the granulated particles 13a against the current collector 11. As a result, the adhesion strength of the binder 13a2 is increased, and the adhesive strength between the powder material 13 of the granulated particles 13a and the current collector 11 is enhanced. In this case, an electrode sheet provided with an active material layer having a higher peel strength can be obtained than in the case of preparing the electrode sheet by only pressing the powder material 13 of the granulated particles 13a against the current collector 11, provided that the powder material 13 of the granulated particles 13a is pressed against the current collector 11 with the same pressing amount (or the same pressing force).

In addition, it is desirable that in the step of pressing the powder material 13 of the granulated particles 13a against the current collector 11, shearing stress be additionally imparted to the powder material 13 of the granulated particles 13a to cause the powder material 13 of the granulated particles 13a to closely adhere to the current collector 11. As a result, the binding strength of the powder material 13 of the granulated particles 13a is increased, and an electrode sheet provided with an active material layer having a high peel strength can be obtained. In this case, an electrode sheet provided with an active material layer having a higher peel strength can be obtained than in the case of preparing the electrode sheet by only pressing the powder material 13 of the granulated particles 13a against the current collector 11, provided that the powder material 13 of the granulated particles 13a is pressed against the current collector 11 with the same pressing amount (or the same pressing force).

«Evaluation of Samples»

Figure 3:
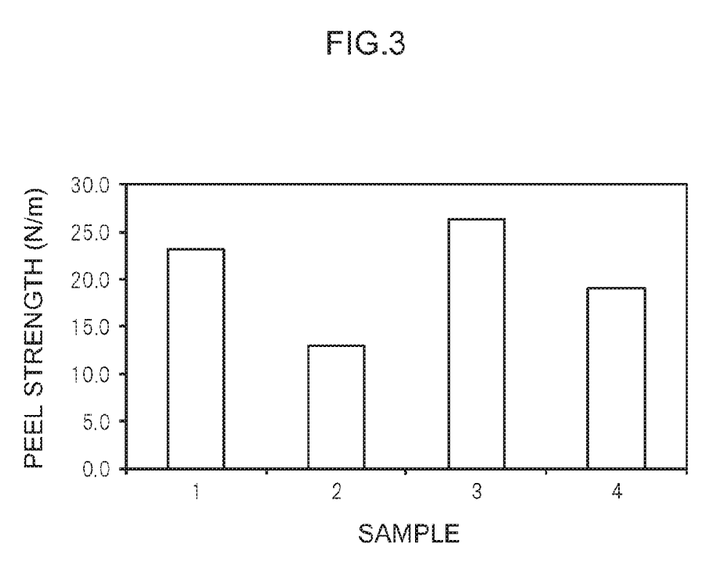
FIG. 3 is a graph showing peel strength of samples 1 through 4 of a lithium-ion secondary battery electrode sheet.

The present inventors manufactured electrode sheets according to the method of manufacturing an electrode sheet proposed herein and also evaluated the peel strength of the active material layer. The following describes an example. FIG. 3 is a graph showing the peel strength of each of samples 1 through 4 of the electrode sheet.

<Samples 1-4>

For sample 1, a mixture paste in which active material particles and a binder are mixed with a solvent is prepared. Then, a binder solution is applied onto the current collector, and the mixture paste is applied thereto at a predetermined weight per unit area. The resultant article is dried and pressed.

For sample 2, a powder material of granulated particles containing active material particles and a binder is prepared. Then, a binder solution is applied onto the current collector, and the powder material of the granulated particles is deposited thereon. The resultant article is simply pressed. Samples 1 and 2 are not the electrode sheets made according to the method of manufacturing an electrode sheet proposed herein, but they are shown as comparative examples for evaluating the peel strength of the electrode sheet depending on the method of manufacturing an electrode sheet.

For sample 3, a powder material of granulated particles containing active material particles and a binder is prepared. Then, a binder solution is applied onto the current collector, and further, the powder material of the granulated particles is deposited thereon at a predetermined thickness. Subsequently, a predetermined amount of water is added thereto, and the resultant article is pressed.

For sample 4, a powder material of granulated particles containing active material particles and a binder is prepared. Then, a binder solution is applied onto the current collector, and further, the powder material of the granulated particles is deposited thereon at a predetermined thickness. Subsequently, shearing stress is imparted to the powder material of the granulated particles while the resultant article is being pressed.

<Materials for Samples 1-4>

Herein, an electrode sheet for the negative electrode of the lithium-ion secondary battery is assumed. The same material is used for samples 1 through 4. Herein, natural graphite is used as the active material particles. The mean particle size (D50) of the graphite used here is about 15 μm. Styrene-butadiene copolymer (SBR) is used as the binder for samples 1 through 4. In addition, the mixture paste prepared for sample contains carboxymethylcellulose (CMC) as the thickening agent. The solvent in the mixture paste of sample 1 is water. A SBR aqueous solution (40 wt %) is used for the binder solution to be applied to the current collector.

The mass ratio of the solid contents of the mixture paste prepared for sample 1 is as follows; Negative electrode active material:Binder (SBR):Thickening agent (CMC) =97.3:2.0:0.7. Here, the mixture paste was applied at a weight per unit area of 7.35 mg/cm$^2$ on the basis of solid content. After the application, the current collector coated with the paste was dried by exposing it to a dry atmosphere at 100° C. for 60 seconds. The active material layer formed after the drying is pressed by passing it between a pair of pressure rollers. Here, the pressure of the pair of pressure rollers was adjusted so that the density of the active material layer became 1.3 mg/cm³.

The mass ratio after the granulation of each of the powder materials of the granulated particles prepared for samples 2 to 4 was set to be as follows; Negative electrode active material:Binder (SBR):Thickening agent (CMC)=97.3:2.0:0.7. Here, the thickness of the powder material of the granulated particles deposited on the current collector was adjusted so that the weight per unit area of the powder material of the granulated particles became 7.35 mg/cm².

For sample 2, the current collector on which the powder material of the granulated particles is deposited is pressed by passing it between a pair of pressure rollers. Here, the pressure of the pair of pressure rollers was adjusted so that the density of the active material layer formed after passing between the rollers became 1.3 mg/cm³.

For sample 3, the amount of the water droplets sprayed by electrostatic spraying per unit area of the powder material of the granulated particles was set to 0.05 mL/cm². In addition, the current collector on which the powder material of the granulated particles is deposited is pressed by passing it between a pair of pressure rollers. Here, the pressure of the pair of pressure rollers was adjusted so that the density of the active material layer formed after passing between the rollers became 1.3 mg/cm³.

For sample 4 as well, the current collector on which the powder material of the granulated particles is deposited is pressed by passing it between a pair of pressure rollers. Here, the pressure of the pair of pressure rollers was adjusted so that the density of the active material layer formed after passing between the rollers became 1.3 mg/cm³, and in addition, the rotational speed of the pressure roller that presses the side of the powder material of the granulated particles was set to be 5% slower than that of the pressure roller that presses the current collector. As a result, the current collector with the powder material of the granulated particles is passed between the rollers while the surface of the powder material of the granulated particles is being pushed backward. Thereby, almost uniform shearing stress is imparted to the powder material of the granulated particles.

<Peel Strength Test>

The peel strength of each of samples 1 through 4 obtained in the above-described manner is evaluated in the following test.

Here, 3 pieces of test specimen are prepared for each of samples 1 through 4 by cutting out the electrode sheet into a predetermined shape. Herein, the shape of the test specimen was 10 mm×150 mm. The current collector of the electrode sheet of the test specimen is fixed to the table of a tensile tester so that the active material layer faces upward (vertically upward). Next, one side of a double-sided tape is affixed to the lower end of a pulling jig, and the other side thereof is affixed to the active material layer. Then, the pulling jig is attached to the tensile tester, and the pulling jig is pulled vertically upward at a predetermined constant rate. Then, the peel strength (tensile strength) [N/m] at the time when the active material layer is peeled from the current collector foil is measured.

Sample 1 is an electrode sheet manufactured by coating the current collector with a mixture paste, and the peel strength is relatively high, 23.1 [N/m]. On the other hand, sample 2 is an electrode sheet manufactured by pressing the powder material of the granulated particles deposited on the current collector. The peel strength of sample 2 is 13.0 [N/m], which is lower than that of sample 1. Sample 3 is an electrode sheet manufactured by spraying water to the powder material of the granulated particles deposited on the current collector, and pressing the powder material and the current collector. The peel strength of sample 3 is 26.3 [N/m], which is higher than that of sample 1. Sample 4 is an electrode sheet manufactured by imparting shearing stress to the powder material of the granulated particles while pressing the powder material of the granulated particles deposited on the current collector. The peel strength of sample 4 19.0 [N/m], which is higher than that of sample 2, although it is lower than that of sample 1.

As with samples 3 and 4, the method of manufacturing a lithium-ion secondary battery electrode sheet proposed herein can improve the peel strength of the obtained active material layer, although the active material layer is formed by depositing powder of granulated particles on the current collector and pressing the powder and the current collector. Particularly with sample 3, the peel strength of the active material layer can be improved to the same level as or a higher level than that can be obtained in the case where the active material layer is formed by applying a mixture paste. Basically, in the respect that the powder material of the granulated particles is deposited on the current collector and pressed, the method of manufacturing a lithium-ion secondary battery electrode sheet proposed herein can simplify or completely eliminate the drying step, in comparison with the case of applying the mixture paste to the current collector. For this reason, the manufacturing cost can be significantly reduced.

As has been described above, in the method of manufacturing a lithium-ion secondary battery electrode sheet proposed herein, the current collector 11, the powder material 13 of granulated particles, and the binder solution 12 are prepared, as illustrated in FIG. 1. Then, the binder solution 12 is applied onto the current collector 11. Subsequently, the powder material 13 of granulated particles is fed onto the current collector 11. Then, the powder material 13 of the granulated particles 13a is pressed against the current collector 11. In the basic manufacturing method, the adhesive strength of the powder material 13 of the granulated particles 13a is enhanced after the powder material 13 of the granulated particles 13a is fed onto the current collector 11 and before or during the time when the powder material 13 of the granulated particles 13a is pressed against the current collector 11.

Specifically, as in sample 3, it is possible to add (preferably spray) water to the powder material 13 of the granulated particles fed onto the current collector 11. Also, as in sample 4, it is possible to impart shearing stress to the powder material 13 of granulated particles while pressing the powder material 13 against the current collector 11. This makes it possible to manufacture an electrode sheet having an active material layer formed thereon with the use of the powder material 13 of granulated particles and also to improve the peel strength of the active material layer. As a result, it is possible to provide an electrode sheet that has a required peel strength.

Hereinabove, various embodiments of the method of manufacturing a lithium-ion secondary battery electrode sheet proposed herein have been described, but the method, according to the present invention, of manufacturing a lithium-ion secondary battery electrode sheet is not limited by any of the foregoing embodiments, unless otherwise stated.

The lithium-ion secondary battery electrode sheet manufactured by the method proposed herein can provide the active material layer with a required peel strength while keeping the manufacturing cost low. Therefore, it can be used suitably for such applications that require mass productivity and stable performance. An example of such applications is a power source (driving power source) for electric motors incorporated in vehicles. The types of the vehicles are not particularly limited, and examples include plug-in hybrid vehicles (PHVs), hybrid vehicles (HVs), electric cargo vehicles, small-sized motorcycles, power assisted bicycles, electric powered wheelchairs, and electric railroads. Such a lithium-ion secondary battery may be used in the form of a battery module, in which a plurality of the batteries are connected in series and/or in parallel to each other.

REFERENCE SIGNS LIST

10—Manufacturing apparatus
11—Current collector (current collector foil)
12—Binder solution
13—Powder material
13a—Granulated particle
13a1—Active material particle
13a2—Binder
21—Conveyor device
21a—Conveyor roller
22—Coating device
22a—Gravure roller
22b—Reservoir
23—Feeding device
23a—Hopper
24—Squeegee
25—Humidifier device
26, 27—Pressure roller

The invention claimed is:

1. A method of manufacturing a lithium-ion secondary battery electrode sheet, comprising the steps of:
 (a) preparing a current collector;
 (b) preparing a powder material of granulated particles containing active material particles and a binder;
 (c) preparing a binder solution;
 (d) applying the binder solution onto the current collector;
 (e) feeding the powder material onto the current collector;
 (f) pressing the powder material against the current collector; and
 (g) spraying droplets of a solvent onto the powder material subsequent to the step (e) and prior to or during the step (f) in an amount from 0.01 mL$^2$ to 0.1 mL/cm$^2$.

2. The method according to claim 1, wherein the solvent is added to the powder material of the granulated particles prior to the step (f).

3. The method according to claim 1, wherein, in the step (f), the current collector and the granulated particles are pressed by a pair of pressure rollers.

4. The method according to claim 3, wherein the pair of pressure rollers are rotated at different rotational speeds.

5. The method according to claim 1, wherein
 the step (f) comprises imparting shearing stress to the powder material of the granulated particles while pressing the powder material of the granulated particles against the current collector.

6. The method according to claim 5, wherein, in the step (f), the current collector and the granulated particles are pressed by a pair of pressure rollers to impart the shearing stress.

7. The method according to claim 6, wherein the pair of pressure rollers are rotated at different rotational speeds.

8. The method according to claim 1, wherein a size of the droplets of the solvent is 100 nm to 1000 nm.

9. The method of claim 1, wherein the droplets of the solvent are sprayed by an electrostatic spraying device that imparts an electrostatic charge to the droplets.

10. The method of claim 1, wherein the binder solution is applied to the current collector in step (d) with a direct gravure roll coater having a pattern engraved on a surface thereof that contacts the current collector.

11. The method of claim 10, wherein the pattern on the surface comprises grooves having a depth of 10 to 30 μm.

12. The method of claim 11, wherein the grooves have a width of 50 μm, and a pitch of 200 μm, along an oblique line inclined with respect to a rotational axis of the roll coater.

13. The method of claim 5, wherein the shear stress is imparted in step (f) by a press device having a pair of flat plates, where the plates are dislocated with respect to one another to apply the shear stress.

14. The method of claim 1, wherein the step (g) is performed during the step (f).

15. The method of claim 1, wherein the solvent consists of water.

16. The method of claim 1, wherein the solvent comprises water and an organic compound selected from the group consisting of alcohols, ethers, ketones, aromatic hydrocarbons, and chlorinated hydrocarbons.

* * * * *